United States Patent [19]

Gottfried

[11] Patent Number: 4,686,375
[45] Date of Patent: Aug. 11, 1987

[54] UNINTERRUPTIBLE POWER SUPPLY COGENERATION SYSTEM

[75] Inventor: Carlos F. Gottfried, Mexico City, Mexico

[73] Assignee: Power Group International Corp., Houston, Tex.

[21] Appl. No.: 836,430

[22] Filed: Mar. 5, 1986

[51] Int. Cl.⁴ .......................... H02J 9/06; H02P 9/42
[52] U.S. Cl. ........................................ 290/2; 290/4 R; 290/30 R; 307/64; 322/4
[58] Field of Search .................. 290/2, 4 R, 4 C, 4 B, 290/4 A, 30 R, 30 A; 307/64, 65, 67, 68, 84, 87; 322/4

[56] References Cited

U.S. PATENT DOCUMENTS

| | | | |
|---|---|---|---|
| 2,688,704 | 9/1954 | Christenson | 290/4 |
| 3,221,172 | 11/1965 | Rolison | 290/4 |
| 3,305,762 | 2/1967 | Geib | 322/4 |
| 3,477,013 | 11/1969 | Smith | 322/4 |
| 3,810,116 | 5/1974 | Prohofsky | 340/172.5 |
| 4,168,459 | 9/1979 | Roesel, Jr. | 322/29 |
| 4,339,779 | 7/1982 | Kalbach | 361/4 |
| 4,406,950 | 9/1983 | Roesel, Jr. | 290/4 |
| 4,412,170 | 10/1983 | Roesel, Jr. | 322/4 |
| 4,438,340 | 3/1984 | Armiger | 290/2 |
| 4,458,710 | 7/1969 | Dodge | 290/4 |
| 4,460,834 | 7/1984 | Gottfried | 307/64 |
| 4,510,756 | 4/1985 | Hise et al. | 290/2 X |

Primary Examiner—William M. Shoop, Jr.
Assistant Examiner—Sharon D. Logan
Attorney, Agent, or Firm—Dula, Shields & Egbert

[57] ABSTRACT

A power system for providing an uninterrupitible power supply comprising a first generator connected to a primary external load, a second generator connected to a secondary external load, and a prime mover connected to said first and second generators by a common shaft. The first generator is electrically isolated from the secondary external load. The prime mover is an internal combustion engine that supplies rotational movement to the common shaft. The secondary external load is an electrical utility. A thermal recovery system is connected to the internal combustion engine.

16 Claims, 1 Drawing Figure

UNINTERRUPTIBLE POWER SUPPLY COGENERATION SYSTEM

FIELD OF THE INVENTION

The present invention relates to uninterruptible power systems. Additionally, this invention relates to uninterruptible power supply systems that cogenerate power. In particular, the present invention relates to uninterruptible power supplies that keep the external load electrically isolated from the utility power supply while assuring adequate power to the external load.

BACKGROUND ART

It is customary in situations of critical electrical power requirements to provide an auxiliary power source which can be switched to and from the load in the event of commercial power failure or excessive power variations. In some situations, however, the criticality of the load is such the interruptions or variations in power caused by such switching, although slight, cannot be tolerated. For example, during the countdown period prior to the launch of a space vehicle, it is very important that the power supply and the load to the various computers and data equipment be uninterrupted. Typically, computer systems require a constant power supply. Interruptions in the power supply can erase memory and injure the software and hardware of the computer. Other situations where uninterrupted power supplies are considered important include: automatic banking services, automatic industrial processes, communication and signaling centers for maritime and aerial transportation, radio and television stations, and various emergency and security services.

Commercial power alone is generally not considered to be sufficiently reliable as a source of power for such usages. Interruptions commonly occur and loads may vary as other users come on and off the commercial power line. These problems are enhanced in the lesser developed countries where power systems are only in the initial stage of development.

Uninterruptible power systems are generally known within the prior art. Such uninterruptible power supplies usually comprise a generator and two prime movers, one of which normally drives the generator, and the other normally being stationary. When the normally operating prime mover ceases to function for any reason, the normally stationary prime mover is brought up to speed and is connected to drive the generator, usually through a clutch, thereby insuring a continuous supply of power from the generator. Commonly, a kinetic energy supply and device such as a flywheel or a DC dynamoelectric machine is coupled to the generator and supplies energy thereto during the transitional period when the generator load is being transferred from one prime mover to the other. One prior art type of no-break power supply comprises an internal combustion engine adapted to be connected through a normally disengaged clutch to a flywheel, the flywheel being connected in turn to the rotor of an electric generator which in turn is connected to the rotor of an AC motor. Another prior art type of no-break power supply employs a DC dynamoelectric machine in place of the flywheel, both of these devices acting to supply kinetic energy during the forementioned transitional period.

In the operation of a prior art no-break power supply of either of the aforementioned types, the generator and kinetic energy supplying device are normally driven by the A.C. motor. When there is a failure of the A.C. motor, as, for example, may be caused by an interruption in the power supplied to the A.C. motor, the internal combustion engine is started automatically, brought up to speed, and the clutch is then engaged. The internal combustion engine then drives the generator. During the transitional period when the load is being shifted from one prime mover to the other, the kinetic energy of the flywheel or DC machine is utilized to maintain the rotation of the generator.

U.S. Pat. No. 4,460,830 describes an uninterruptible power supply system that achieves many advantages not found in the prior art. In particular, this is a power system providing an uninterruptible power supply to an external load comprising a first generator adapted to supply energy to the external load, a first motor adapted to be connected to a source of power external to the power system, a standby generator electrically connected to the first motor, and a standby motor drivingly connected to the first motor. This uninterruptible power supply provides a constant source of power to the external load while isolating the external load from variation that may occur in the utility line.

This device and other common UPS systems, although effective in preventing interruptions in power supplies, has an initial capital cost that is difficult to recapture during the years of use of the device. In addition, a diesel engine of considerable size is required, although used during times of electrical blackout or shortage.

It is a object of the present invention to provide an uninterruptible power supply system that provides power to an external load without relying on the main utility source.

It is another object of the present invention to provide for cogeneration of electricity during the production of energy for the external load.

It is another object of the present invention to provide an uninterruptible power supply system that has a relatively quick payback of the initial cost.

There is still a further object of the present invention to provide an uninterruptible power supply system that has low maintainence requirements and costs.

These and other objects and advantages of the present invention will become apparent from a reading of the attached specification and appended claims.

DISCLOSURE OF THE INVENTION

The present invention is a power system for providing an uninterruptible power supply to an external load comprising a first generator that supplies energy to a primary external load, a second generator connected to a secondary external load, and a prime mover connected to the first generator and the second generator by a common shaft. The first and second generators are also connected by this common shaft. The first generator is electrically isolated from the secondary external load. The prime mover supplies mechanical energy to the shaft and heat energy (as a byproduct of combustion).

The secondary external load is an electrical utility. The second generator supplies cogenerative power to this electric utility. A controller is interposed electrically between the second generator and the electric utility. This controller causes the secondary generator to become disconnected from the secondary load upon an interruption in the secondary load.

The first generator is a three-phase synchronous AC generator adapted so as to produce power relative to the rotational movements of the common shaft. A voltage regulator is electrically connected to the output of the first generator for maintaining the desired voltage to the primary external load. This desired voltage from the first generator is adjustable to the requirements of the primary external load. The second generator is also a three-phase synchronous AC generator.

A field controller is electrically connected to the output of the first generator and to the second generator. This field controller regulates the energy passing to the secondary external load.

The prime mover has a capacity to generate sufficient energy in the first generator so as to meet the peak load requirements of the primary external load. This prime mover is an internal combustion engine, such as a gas engine or a gas turbine, diesel engine, or steam engine. The prime mover further includes a thermal recovery system that is connected to the prime mover for capturing heat from the prime mover and passing this heat to a use external of the system (usually associated with the primary external load). The thermal recovery system includes a fluid delivery system that communicates with the interior of the prime mover. This fluid delivery system passes a heat-absorbing liquid into the internal combustion engine and passes the heated liquid from the internal combustion system. A speed governor is connected to the internal combustion engine for limiting the rotational rate of the common shaft upon the occurrence of a disconnect between the second generator and the secondary external load.

BEST MODE FOR CARRYING OUT THE INVENTION

Figure 1:
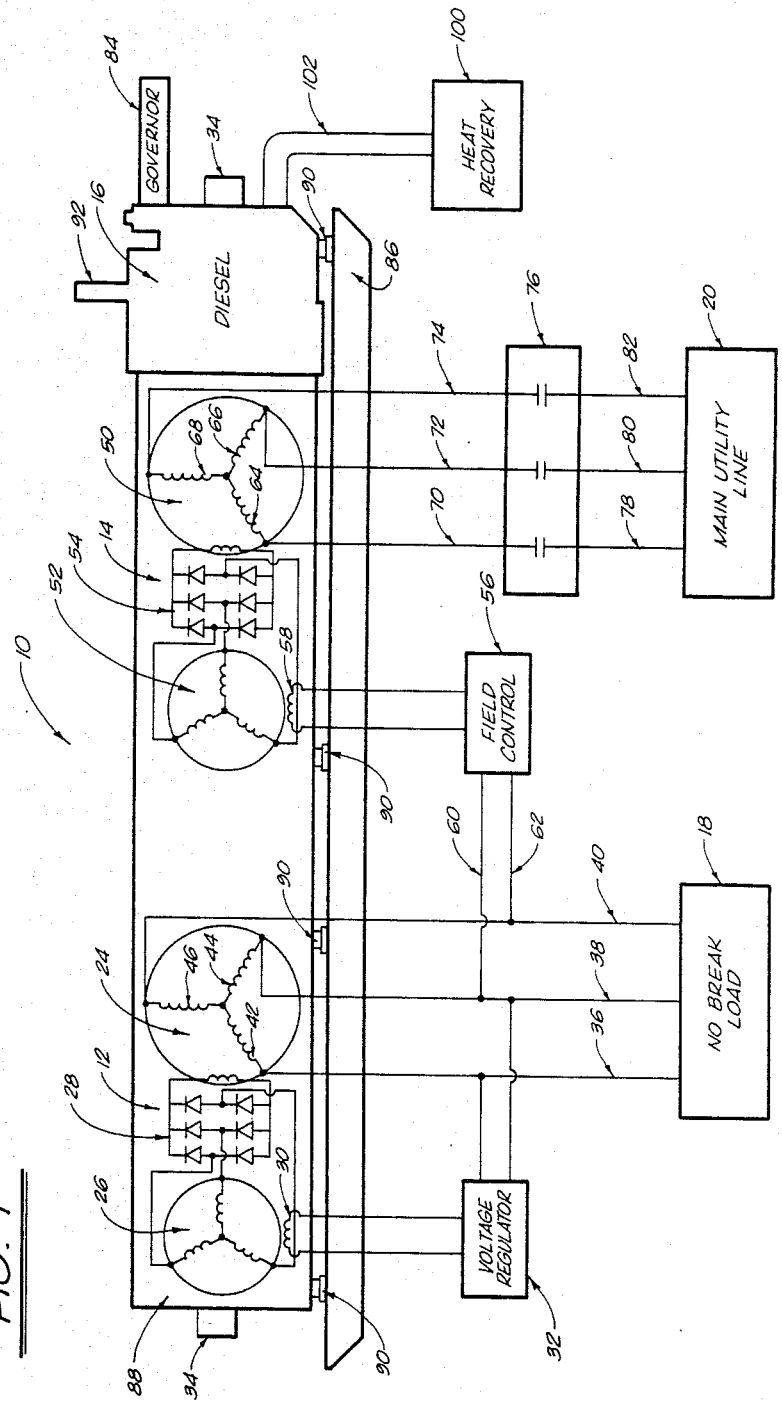
FIG. 1 is a schematical representation of the uninterruptible power and cogeneration system according to the present invention.

Referring to FIG. 1, there is shown at 10 the uninterruptible and cogenerative power system according to the present invention. Specifically, uninterruptible power system 10 includes first generator 12, and second generator 14, prime mover 16, primary external load 18, and secondary external load 20. Each of these components are arranged and adapted so as to provide an uninterruptible supply of electricity to external load 18.

First generator 12 is a synchronous, three-phase AC generator. Generator 12 has high frequency rectified excitation. It is brushless, has reinforced windings, N.E.M.A. (National Electrical Manufacturing Association) class F insulation and reconnectable terminals. As illustrated, generator 12 supplies a single or three-phase load. Field 24 of generator 12 receives power from an exciter 26. The rotor armature exciter winding is connected through conventional rectifiers 28 to the field winding 24 of generator 12. The exciter 26 has a field winding 30 which receives power from generator 12 under the control of a conventional voltage regulator 32. Generator 12 and exciter 26 are conventional brushless units, the rotors of both machines being mounted to common shaft 34. The rectifiers 28 are carried, through not shown, on a support which also rotates with shaft 34. Regulator 32 acts to increase or decrease the excitation of exciter field winding 30 to the degree needed to maintain the output voltage at a desired value. Once generator 12 obtains its substantially rated speed, regulator 32 is able to sufficiently influence the excitation of generator 12 so as to maintain the output voltage of the latter at a substantially desired value. The output voltage of generator 12 is passed to the external load 18 through line 36, 38, and 40. Lines 36, 38, and 40 connect with stator windings 42, 44, and 46, respectively. Stator windings 42, 44, and 46 are part of regulator 12. Voltage generator 32 is connected electrically to line 36 and 38.

Second generator 14 acts as the cogenerator of the present invention. Second generator 14 is of a type similar to that of first generator 12. Specifically, generator 14 includes field 50 and exciter 52. Conventional diodes 54 are arranged with respect to the armature winding of exciter 52. A field control 56 is connected to the field winding 58. Field controller 56 is of a conventional variety. In particular, field controller 56 serves to control the cogeneration generator. Field controller 56 has lines 60 and 62 connected to lines 38 and 40, respectively, of the first generator 12. Field controller 56 serves to optimize the voltage and power factor generated by cogenerator 14.

Generator 14 has stator windings 64, 66, and 68. Stator windings 64, 66, and 68 are connected to lines 70, 72, and 74, respectively. Lines 70, 72, and 74 extend from generator 14 to controller 76. Lines 70, 72, and 74 are positioned within controller 76 so as to be in switchable position relative to lines 78, 80, and 82, respectively. Lines 78, 80, and 82 are connected to the main utility line 20.

Generator 14 and exciter 52 are conventional brushless units, the rotors of both machines being mounted on common shaft 34. The rectifiers 54 are carried, though not shown, on a support which also rotates with the shaft 34. As can be seen in FIG. 1, first generator 12 and second generator 14 are connected to common shaft 34. Any rotational movement imparted to common shaft 34 will also imparted to the associated generators.

Prime mover 16 is an internal combustion engine or turbine. In particular, prime mover 16 is a gas engine having a water-cooled radiator or heat interchanger, along with low oil pressure and high water temperature protection. Prime mover 16 should have sufficient capacity, in combination with generator 12, to meet the peak load requirements of primary load 18. A speed governor 84 is incorporated into engine 16. Speed governor 84 prevents the diesel engine from overspeeding in the event of the removal of loads from either primary load 18 or utility load 20. Governor 84 is a mechanical or electrical apparatus that is readily available for use with internal combustion engines. Gas engine 16 is fixedly mounted on skid 86. In addition, the first generator 12 and second generator 14 are mounted within a single enclosure 88 on skid 86. Supports 90 maintain the enclosure 88 on skid 86. Alternatively, prime mover 16 can be a gas turbine, diesel engine, or steam turbine. An electric starter 92 is connected to prime mover 16.

Primary load 18 is the facility that receives the power to be generated by the present invention. Primary load 18 is electrically isolated from the main utility line, or secondary load, 20. Since the generator 12 and prime mover 16 are sized to the peak load of primary load 18, virtually all power will be transmitted to the load 18 by first generator 12 in combination with prime mover 16.

The main utility line 20 is a utility power line. This utility power line passes three-phase commonly available voltages such as 208, 230, 480, 600, 2300, 4160, 6600, 13800, volts AC, 50 or 60 Hertz. Power is passed to the utility 20 by way of cogenerator 14.

Controller 76 is adapted so as to receive lines 70, 72, and 74 from first generator 14. Controller 76 also receives lines 78, 80, and 82 from the main utility line 20. Switches 94, 96, and 98 connect these lines within transfer controller 76. Controller includes metering and sensing equipment for voltage, current, frequency, generator voltage regulators, magnetic contacts and relays, a manual three-phase curcuit breakers, indicator lights for normal and abnormal operation, and various other equipment. In typical operation, switches 94, 96, and 98 will be closed (synchronized) within controller 76 so as to allow the present invention to cogenerate power and pass this power to the main utility line 20.

A heat recovery system 100 is connected by conduit 102 to gas engine 16. Heat recovery unit 100 is designed to accelerate the payback of the present invention by taking advantage of the available heat energy produced by the system. Heat recovery unit 100 allows the heat generated by gas engine 16 to be passed to uses external of the system. For example, conduit 102 can pass a heat absorbing fluid into gas engine 16. As this heat-absorbing fluid passes into the gas engine 16, it abosrbs heat produced and passes this heat outwardly. Various types of heat recovery units are well known within the art. This heat recovery unit 100 can also be used in conjunction with chillers as part of an air conditioning cycle. Heat recovery unit 100 maximizes the efficiency of the present invention. The heat of the diesel engine 16 is no longer uselessly dissipated. This heat may be recycled to heat the interior of the facility enclosing the power system 10 or passed for some other use.

The operation of the present invention is described as follows.

Each of the generators are sized to the peak efficiency power output of the prime mover. The engine runs 100% of the time at its constant peak efficiency power output, thereby optimizing fuel consumption and life of the prime mover. During normal operation the generators, because of the system configuration, will inherently automatically distribute the power being produced by the prime mover between the primary load 18 and the second load 20.

During times of normal non-peak loads in primary load 18, generator 12 will produce sufficient power to supply the facility. Since the generator 12 and associated prime mover 16 are sized to meet the peak requirements of load 18, an additional amount of energy remains. This excess energy passes through to the cogenerator 14 the main utility line. Thus, the excess power that is produced from non-peak usage of electricity by primary load 18 goes directly into the main utility line 20. The electric utility will, under cogeneration requirements, pay (or credit) the value of this cogenerated electricity. The value of this cogenerated electricity can be used to offset the capital cost of the equipment of the power supply 10.

When load 18 is at peak usage, all of the voltage produced by generator will be absorbed by load 18. As a result, no excess voltage passes into the main utility line. However, because of the redundancy of the cogenerator 14, a standard power output is being passed as cogeneration into the utility line 20.

Under those circumstances when the load 18 exceeds peak usage, the excess required voltage can be drawn from the second generator 14. Under these circumstances, a lesser amount of power is being passed to the main utility line. Under these circumstances, less return from cogeneration is realized.

Occasionally, blackouts will occur in the main utility line 20. Under such circumstances, the sensing circuitry in the transfer controller 76 disconnects the cogenerator 14 from the main utility line 20. In particular, switches 94, 96 and 98 in controller 76 open. When power returns to the main utility line 20, the switches 94, 96 and 98 will close.

In the event of an overload, or short circuit, in the load 18, then the interconnection of the main utility line 20 with cogenerator 14 will provide power to load 18. Under circumstances, second generator 14 receives voltage from the main utility line 20 and becomes a motor, momentarily. As a motor, the generator 14 operates to stabilize the load. Once this overload is overcome, cogenerator 14 reverts back to being a generator and passes power to the main utility line 20.

The present invention offers a number of advantages not found in prior uninterruptible power systems. The uninterruptible power systems generally seen today have been based on static-type electronic rectifier components and circuitry working in conjunction with battery banks of limited duration. The present invention does not have an operating time limit as do batteries, nor does it require high technology personnel and parts for installation, servicing, or operation. Since no mechanical clutching mechanism is utilized in the present invention, the internal combustion engine is not subject to severe strain or wear. As a result, standard industrial or automotive engines may be used without the need to be reinforced or redesigned. In addition, the life and reliability of the engine will be much greater. Since there are no mechanical parts to wear in the clutch mechanism, there are no parts to replace or maintain.

Since the power systems of the lesser developed countries are either unstable or inadequate, the present invention eliminates many of the problems that can be encountered from blackouts and brownouts. As previously mentioned, the external load is electrically isolated from the utility power line during the normal operation of the system. This prevents losses of computer memory and other data caused by utility line interruption, interference, or stoppage. It avoids the losses and stoppages of important electric and electronic apparatus. Since the power to the external load is isolated, the present invention further protects against disturbances caused by switching from the utility line to the emergency system.

The cost of the present uninterruptible power system is considerably less than other systems. The components of the present invention are presently available at a relatively low cost. There is no added cost of purchasing battery banks, transformers, or intricate electronic equipment which do not offer a payback in power savings. Furthermore, the installation, maintenance, and operation of the equipment can be performed by persons having limited electric motor and generator experience.

With the use of the cogenerator mechanism, the present invention can accelerate the payback over a relatively shorter period of time. During times of normal operation, the cogenerator of the present invention passes power (kilowatt-hours) into the main utility line. Under the requirements of cogeneration, the electric utility is required to pay the producer of this electricity. During times of non-peak use, the excess unused electrical energy is passed back into the utility line for a monetary refund. Since the gas engine and generator are sized for constant use at peak capacity, the efficiency of the system is maximized. The incorporation of the cogeneration unit acts as an automatic power regulator of the system. During times of non-peak use, the power (kilowatts) produced by the system is passed directly into the utility line. Thus, there is a return on the capital cost for installing the system.

Additionally, and furthermore, the economic benefits of the present invention are enhanced by the inclusion of the heat recovery unit. It is believed that the addition of the heat recovery unit enhances the economic payback of the system. Instead of inefficiency wasting heat generated by the prime mover of the system, the heat is utilized and returned for external use. By present estimates, it is believed that the present invention would offer an economic payback within a few years of normal usage.

The foregoing disclosure and description of the invention is illustrative and explanatory thereof, and various changes in the details of the illustrated apparatus may be made within the scope of the appended claims without departing from the true spirit of the invention. The present invention should only be limited by the following claims and their legal equivalents.

I claim:

1. A power system for providing an uninterruptible power supply comprising:
   a first generator means for supplying energy to a primary load;
   a second generator means connected to an electrical utility, said first and second generator means being connected by a common shaft, said first generator means being electrically isolated from said electrical utility;
   prime mover means connected to said common shaft, said prime mover means for supplying mechanical energy to said shaft; and
   controller means interposed electrically between said second generator means and said secondary external load, said controller means causing said second generator means to become disconnected from said secondary load upon interruptions in said secondary load.

2. The system of claim 1, said first generator means comprising a three-phase synchronous A.C. generator adapted so as to produce power relative to the rotational movement of said common shaft.

3. The system of claim 1, further comprising:
   a voltage regulator electrically connected to the output of said first generator means for maintaining the desired voltage to said primary load.

4. The system of claim 3, said desired voltage from said first generator means being adjustable to the requirements of said primary load.

5. The system of claim 1, said controller means responsive to the restoration of power in said secondary external load, said controller means switchably causing said second generator means to become electrically connected to said secondary external load upon said restoration of power.

6. The system of claim 1, said second generator means comprising a three-phase synchronous A.C. generator.

7. A power system for providing an uninterruptible power supply comprising:
   a first generator means for supplying energy to a primary load;
   a second generator means connected to an electrical utility, said first and second generator means connected by a common shaft, said first and second generator means being electrically isolated from said electrical utility;
   prime mover means connected to said common shaft, said prime mover means for supplying mechanical energy to said shaft; and
   field control means electrically connected to the output of said first generator means and to said second generator means, said field control means for regulating the energy passing to said electrical utility.

8. The system of claim 1, said prime mover means hving a capacity to generate sufficient energy in said first generator means to meet the peak load requirements of said primary load.

9. The system of claim 1, said prime mover means being an internal combustion engine.

10. The system of claim 9, said prime mover means being a diesel engine.

11. The system of claim 9, further comprising:
    thermal recovery means connected to said prime mover means for capturing heat from said prime mover means, said thermal recovery means passing said heat external of said system.

12. The system of claim 11, said thermal recovery means comprising:
    fluid delivery means communicating with the interior of said prime mover means, said fluid delivery means passing heat absorbing liquid into said internal combustion engine and passing a heated liquid from said internal combustion engine for use external of said system.

13. A power system comprising:
    a first generator means for supplying energy to a primary load;
    a cogeneration means connected electrically to an electrical utility, said primary load electrically isolated from said electric utility;
    a rotatable shaft connecting said first generator means and said cogeneration means;
    a prime mover means operably connected to said rotatable shaft, said prime mover means for imparting rotation and motion to said rotatable shaft, said prime mover means electrically isolated from said electrical utility; and
    controller means electrically interposed between said cogeneration means and said electrical utility, said controller means for causing said cogeneration means to become disconnected from said electrical utility upon interruptions in said electrical utility.

14. The power system of claim 13, said prime mover means comprising an internal combustion engine, said power system further comprising:
    thermal recovery means connected to said internal combustion engine for capturing heat from said internal combustion engine, said thermal recovery means passing said heat to a use external of said system.

15. The power system of claim 13, said first generator means comprising a three-phase synchronous A.C. generator adapted so as to produce power relative to the rotational movement of said rotatable shaft, said cogeneration means comprising a three-phase synchronous A.C. generator.

16. A power system comprising:
    a first generator means for supplying energy to a primary load;

a cogeneration means connected electrically to an electrical utility, said primary load electrically isolated from said electric utility;

a rotatable shaft connecting said first generator means and said cogeneration means;

a prime mover means operably connected to said rotatable shaft, said prime mover means for imparting rotation and motion to said rotatable, said prime mover means electrically isolated from said electrical utility; and field control means electrically connected to the output of said first generator means and to said cogeneration means, said field control means for regulating the energy passing to said cogeneration means from said first generator means.

* * * * *